US010265631B2

(12) United States Patent
Klarer

(10) Patent No.: US 10,265,631 B2
(45) Date of Patent: Apr. 23, 2019

(54) WATER SLIDE AND WATER SLIDE SYSTEM

(71) Applicant: KLARER FREIZEITANLAGEN AG, Hallau (CH)

(72) Inventor: Stefan Klarer, Hallau (CH)

(73) Assignee: KLARER FREIZEITANLAGEN AG, Hallau (CH)

( * ) Notice: Subject to any disclaimer, the term of this patent is extended or adjusted under 35 U.S.C. 154(b) by 0 days.

(21) Appl. No.: 15/708,441

(22) Filed: Sep. 19, 2017

(65) Prior Publication Data
US 2018/0036643 A1  Feb. 8, 2018

Related U.S. Application Data

(63) Continuation of application No. PCT/EP2016/055727, filed on Mar. 16, 2016.

(30) Foreign Application Priority Data

Mar. 19, 2015  (DE) .................. 10 2015 104 124

(51) Int. Cl.
*A63G 21/18* (2006.01)
*A63G 21/02* (2006.01)
(Continued)

(52) U.S. Cl.
CPC ............ *A63G 21/18* (2013.01); *A63G 21/02* (2013.01); *A63G 31/007* (2013.01); *G06F 3/14* (2013.01)

(58) Field of Classification Search
CPC ........ A63G 21/00; A63G 21/10; A63G 21/18; A63G 31/00; A63G 31/007; A63B 69/0093; A63B 2009/008
(Continued)

(56) References Cited

U.S. PATENT DOCUMENTS 5,482,510 A  * 1/1996 Ishii ................. A63G 31/16
                                                     472/61
7,967,692 B2 * 6/2011 Werner ................ A63G 21/18
                                                     434/44
(Continued)

FOREIGN PATENT DOCUMENTS

JP      H04-325181 A     11/1992
WO    WO 2009/055555 A2   4/2009

OTHER PUBLICATIONS

International Search Report dated Jun. 15, 2016 issued in International Patent Application No. PCT/EP2016/055727.

*Primary Examiner* — Kien Nguyen
(74) *Attorney, Agent, or Firm* — Arent Fox LLP

(57) ABSTRACT

A water slide includes a blind tube portion having a blind tube opening on a front end of the blind tube portion that is adjacent to the tubular slide portion of the water slide. The opening is closed by a transparent peripheral wall segment of the tubular slide portion, which extends in the sliding direction as well as in the peripheral direction of the tubular slide portion. The transparent peripheral wall segment may be curved in the peripheral direction and preferably fits into the shape of the tubular slide portion. Like the tubular slide portion, the blind tube portion may include a peripheral wall, for example, being closed on the periphery. The blind tube portion may include a dead end. The longitudinal extent of the blind tube portion is preferably much shorter than that of the tubular slide portion.

21 Claims, 2 Drawing Sheets

(51) Int. Cl.
*A63G 31/00* (2006.01)
*G06F 3/14* (2006.01)

(58) Field of Classification Search
USPC ........ 472/13, 116–117, 128–129; 104/69, 70
See application file for complete search history.

(56) References Cited

U.S. PATENT DOCUMENTS

2009/0143155 A1   6/2009  Werner
2010/0160054 A1   6/2010  Henry
2014/0309049 A1  10/2014  Leach \* cited by examiner

WATER SLIDE AND WATER SLIDE SYSTEM

CROSS-REFERENCE TO RELATED APPLICATIONS

This application is a continuation of International Application Number PCT/EP2016/055727 filed Mar. 16, 2016, which claims priority to German Application Number 10 2015 104 124.3 filed Mar. 19, 2015. Each of these priority applications is incorporated herein by reference.

BACKGROUND OF THE INVENTION

Field of the Invention

The disclosure relates to a water slide having a slide section that has a sliding surface and defines a sliding direction, i.e., a water slide designed as a tubular slide in at least some sections, preferably continuously, having a peripheral wall, preferably enclosed at the periphery.

Furthermore, the disclosure relates to a water slide system.

Background of the Invention

Water slides designed as tubular slides have become well known as an attraction in amusement parks as well as swimming pools both indoors and outdoors. There have been efforts to create newer and newer slide experiences for the users but without endangering their safety.

Thus, for example, US 2010/0016091 A1 describes a water slide, which has large- and small diameter segments disposed in alternation, connected to one another by reducing segments and/or conical segments.

An alternative slide is described in WO 2013/172801 A1, for example. This tubular slide is characterized by wider curve geometries, which define a specific shape of the course of the sliding direction.

A water slide with a large number of branches and various slide segments is known from US 2003/0027648 A1.

BRIEF SUMMARY

Against the background of the efforts described above as well as the prior art explained above, to the disclosure provides a novel water slide that can be used safely and offers the user an unusual slide experience.

Sensory illusions in particular are to be achieved by utilizing the effects of acceleration and/or centrifugal forces. Furthermore, the disclosure provides a suitably improved water slide system.

In an aspect, the disclosure provides a water slide with a blind tube portion having a blind tube opening, on a front end of the blind tube portion that is adjacent to the tubular slide portion of the water slide. The opening is closed by a transparent peripheral wall segment of the tubular slide portion, which extends in the sliding direction as well as in the peripheral direction of the tubular slide portion. The transparent peripheral wall segment preferably is curved in the peripheral direction and preferably fits into the shape of the tubular slide portion. Like the tubular slide portion, the blind tube portion preferably includes a peripheral wall, in particular being closed on the periphery. In an aspect, it is especially expedient, although not necessary, to ultimately close the blind tube portion, i.e., to design it as a dead end. The longitudinal extent of the blind tube portion is preferably much shorter than that of the tubular slide portion.

The disclosure also provides a water slide system including the above water slide and a water pump for conveying water to form a water stream on the slide surface of the tubular slide portion and on at least some sections of the transparent peripheral wall segment.

All combinations of at least two features disclosed in the description, the claims and/or figures fall within the scope of the disclosure.

The disclosed water slide and water slide system is based on the concept of providing a blind tube portion adjacent to a tubular slide portion, through which a user can slide, in particular from top to bottom, wherein the cross section of the blind tube portion is covered by a transparent peripheral well segment of the tubular slide portion, i.e., closing the blind tube portion, preferably completely. In other words, a partial segment of the peripheral wall of the tubular slide portion is made of a transparent material which extends over a blind tube opening of an adjacent blind tube portion so that the user cannot enter the blind tube portion but instead slides further along the sliding direction as defined by the tubular slide portion and thereby passes by the blind tube opening within the tubular slide portion. A user can slide through the tubular slide portion from its beginning to its end, whereas when a user starts from the tubular slide portion, he cannot slide into the blind tube portion. The blind tube portion, in particular the blind tube opening, is preferably disposed in such a way that a user in sliding through the tubular slide portion in a region in front of the blind tube opening will get the impression that the intended sliding direction and/or an intended target slide path runs directly from the tubular slide portion through the blind tube opening and into the blind tube portion. However, since the blind tube opening is closed by a transparent peripheral wall segment of the tubular slide, the user—surprisingly for him—is guided past the blind tube opening within the tubular slide portion, thereby describing or following an unexpected or unforeseeable curve and/or following an unexpected gradient—depending on the shape of the tubular slide portion—in the area of the transparent peripheral wall segment or in the sliding direction behind it and thereby experiences acceleration forces and/or centrifugal forces that are surprising for him. For example, when the tubular slide portion describes an unexpected and/or unpredictable curve and/or follows an unexpected gradient, the user would have to assume, on the basis of the visual relationships, that he would slide into the blind tube portion straight away or with a predefined curvature or with a uniform gradient. To complete the effect described above, it is preferable if the transparent peripheral wall segment of the tubular slide portion continues the adjacent tubular wall segment steadily, i.e., continuously, in the sliding direction and in the peripheral direction.

An inside peripheral contour of the blind tube portion preferably corresponds at least approximately to a corresponding peripheral contour of the tubular slide portion in an area adjacent to the blind tube portion. Additionally or alternatively, the size of the cross-sectional area of the blind tube portion preferably has at least approximately the cross-sectional area of the tubular slide portion, and/or the tubular slide portion and the blind tube portion have at least approximately the same maximum diameter. It is most especially preferred when the tubular slide portion and/or the blind tube portion is/are designed to be cylindrical, in particular with a circular cross-sectional contour or an oval cross-sectional contour. For the case of selection of an oval cross-sectional contour, the oval is designed to be flattened at least in a lower area and optionally also in an opposite area. The blind tube portion preferably has a minimum length (minimum depth) of 5 cm, preferably 10 cm. It is most especially preferred if the blind tube portion has a length of at least 20 cm, more preferably at least 50 cm, most especially preferably of more than 1 m, more preferably of more than 2 m, most especially preferably more than 3 m, measured starting from the transparent peripheral wall segment.

At one end, the blind tube portion may be designed to be sealed with a cover plate and/or a mirror. Alternatively, it is also conceivable to have an open embodiment variant ending more or less in "nothing," i.e., in air.

A further enhancement of the illusion and/or surprise effect is possible in that the transparent peripheral wall segment forms a wettable segment of the slide surface of the tubular slide portion in at least some sections. In other words, a water flow preferably in the form of a water film flows over the transparent peripheral wall segment in at least some sections, so that a user can slide directly over the blind tube opening. The transparent peripheral wall segment and thus the blind tube opening are preferably disposed laterally thereto and/or in a bottom segment of the peripheral wall of the tubular slide portion. It is especially expedient for the case when a water film is applied to the transparent peripheral wall segment, such that the flow conditions of the water slide and/or the system are designed, so that a laminar water flow through which one can see better than through a turbulent flow is created on the transparent peripheral wall segment, in particular a water film, so as not to diminish the desired surprise effect.

It has proven to be especially expedient if the peripheral wall of the tubular slide portion is opaque in an area around the transparent peripheral wall segment, which extends over the blind tube opening, for example, by being made of glass, in particular pigmented and/or opaque plastic and/or from laminated fiberglass-reinforced plastic, which is preferably colored and/or opaque or is at least less transparent than the transparent peripheral wall segment itself covering the blind tube opening to thereby reinforce the impression that the only conceivable path of the slide runs through the blind tube opening and/or the transparent peripheral wall segment.

There are various possibilities with regard to the choice of materials and/or a concrete embodiment of the transparent (blind tube opening cover) peripheral wall segment of the tubular slide portion. This is preferably designed so that the user sees little or no difference between a free cross section and air or, in other words, cannot recognize that the blind tube opening is closed. Suitable materials for forming the transparent peripheral wall segment are made of glass, for example, in particular clear glass, wherein, for the case of using glass, it is preferably in the form of safety glass. Alternatively, it is also conceivable to use a transparent plastic, for example, polymethyl methacrylate (acrylic glass).

Especially good surprise effects can be achieved by generating and/or utilizing corresponding centrifugal forces by having the blind tube portion to a curve segment of the tubular slide portion and having the transparent peripheral wall segment be curved not only in the peripheral direction of the tubular slide portion but also in the curved direction of the tubular slide portion. It is especially expedient if the blind tube portion is adjacent to an outer curve radius of the aforementioned curved segment of the tubular slide portion, i.e., the transparent peripheral wall segment is disposed in the area of an outer radius of the curve described by the tubular slide portion in at least some segments. It is also preferable if the blind tube portion is disposed in such a way that the user does not suspect he is continuing to slide in a curve of the tubular slide portion but instead is sliding into the blind tube portion more or less in a straight line or in a curve radius that is different from the curve radius of a curve of the tubular slide portion. In other words, the blind tube portion preferably lengthens a previous sliding direction, which can be ensured, for example, by an essentially tangential extent of the blind tube portion, based on the curve radius of the curve segment of the tubular slide portion.

It is especially expedient when a bottom segment of the tubular slide portion and the bottom segment of the blind tube portion form an angle.

Especially impressive surprise effects can be achieved if the blind tube portion extends vertically downward in a straight line, but the tubular slide portion is inclined to the vertical. In this case, the user will fear falling into the blind tube portion but then will slide over it because of the transparent peripheral wall segment. A similar effect, although somewhat weaker, can be achieved if the blind tube portion does not extend exactly vertically but nevertheless follows a steep decline, in particular in that the blind tube portion and/or its longitudinal extent is inclined at an angle between 1° and 45°, preferably between 1° and 25° to the vertical, wherein it is preferable if a corresponding inclination of the tubular slide portion is less than the angle of inclination of the blind tube portion.

Optimum effects are achieved if a blind slide segment, preferably formed by a bottom segment of the blind tube portion, lengthens the slide surface of the tubular slide portion steadily, in particular in a straight line with an assumed linear slide surface path of the tubular slide portion in an area of the sliding direction upstream from the blind tube opening or for the case of a curved slide surface path in an area upstream from the blind tube opening, with a radius of curvature, which is preferably the same or optionally differs only slightly.

In an aspect, a design of the water slide includes a cover segment, i.e., an upper segment of the tubular slide portion, that develops continuously into a cover segment of the blind tube portion, and/or a bottom segment of the tubular slide portion that develops continuously into a bottom segment of the blind tube portion. The highest path lines of the two cover segments extending in the direction of the respective longitudinal extent and connected continuously to one another or to the lowest curve lines of the two bottom segments are preferred.

It is fundamentally possible to have only a single blind tube portion adjacent to the tubular slide portion. However, an embodiment in which several blind tube portions are adjacent to the tubular slide portion (in the manner described above) is conceivable. It is possible for at least two blind tube openings of two blind tube portions to be spaced a distance apart in the sliding direction. Additionally or alternatively, it is possible to arrange two blind tube openings in the same peripheral position in at least some segments but side by side in the peripheral direction, in particular spaced a distance apart from one another. For the case of providing at least two blind tube portions, it is especially expedient for these to extend in different directions and/or to be provided at a distance from one another in the peripheral direction, in particular such that they have a different spacing from the tubular slide portion directly adjacent in each case, this distance being different for each one.

For further reinforcement of the surprise and/or deception effect, it is proposed in an aspect that lighting means (e.g., light bulbs, light emitting diodes (LEDs), external windows) are designed and disposed so that the blind slide segment is illuminated more brightly than the tubular slide portion in an area of the sliding direction upstream and/or downstream from the blind tube opening be assigned to the blind slide segment. In other words, due to the brighter illumination of the blind tube portion, the user's view is focused on the blind tube portion, so that the user's perception is deflected from the continuance of the actual slide path in the tubular slide portion. The blind tube portion is preferably lighted more brightly, at least in a transitional area to the tubular slide portion, than the tubular slide portion, preferably 0.5 m to 2 m, more preferably from 1 m to 2 mm upstream and/or downstream from the blind tube opening and/or an area at a distance from the transitional area, in particular the transparent peripheral wall. It may also be reasonable and preferred not to illuminate the actual transitional area to an increased extent to prevent reflections, but instead to illuminate the blind tube portion more brightly in an area at a distance from the transitional area than in the aforementioned transitional area itself.

Another enhancement of the surprise effect can be achieved by the fact that a three-dimensional object, for example, in the form of a person, an animal or a mythical creature, such as a dragon or a shark, may be disposed in the blind tube portion, preferably within a free blind tube cross section, so that the user is thereby given the impression of sliding into this object, in particular just before being deflected within the tubular slide portion and/or deflected past it. In addition or as an alternative to a three-dimensional object, an image of such an object may also be disposed in the blind tube portion.

It has proven be especially expedient if the blind tube portion has a mirror on the end spaced away from the tubular slide portion, this mirror preferably being disposed in such a way that it reflects a blind tube portion disposed in front of it in order to impart an increased depth perception to the user. This impression can be supported by lighting elements, in particular LEDs, in particular in the form of rings or a (luminous) spiral coiling in the circumferential direction along a blind tube portion, disposed on the periphery of the blind tube portion.

It is also conceivable to arrange a projection surface, for example, in the form of a waterfall, in the blind tube portion, so that a wide variety of images, in particular films, can be displayed on the screen or on the projection surface—so it is also conceivable, for example, to represent and/or simulate an apparently endless blind tubular course.

The disclosure is also directed to a water slide system with a water slide designed according to the concept of the water slide as well as with a water pump designed and disposed to convey water to form a water stream on the slide surface of the tubular slide portion. A particularly good optical illusion effect can be achieved if a blind water stream is also more or less created in the blind tube portion, in particular at the bottom side there, in order to give the user the impression even more intensely that he can slide through and/or over the blind tube portion and/or a blind slide area formed therein. Alternatively, it is also conceivable to intentionally omit any water directed at the blind tube portion and to create a stream of water only in the tubular slide portion.

As already mentioned, it is preferable if, for the case when the transparent peripheral wall segment forms a portion of the slide surface in at least some segments, a laminar water film, which is thus optimally transparent, is produced on it. Alternatively, it is also conceivable to direct the water stream created by the water pump around the transparent peripheral wall segment over which the user can nevertheless slide by means of a corresponding arrangement of the transparent peripheral wall segment and/or through appropriate flow guiding means.

BRIEF DESCRIPTION OF THE DRAWINGS

Additional advantages, features and details of the invention are derived from the following description of preferred embodiments and also on the basis of the drawings, which show:

FIG. 1b is a perspective view of the first example water slide in FIG. 1a.

FIG. 2b is a perspective view of the second example water slide in FIG. 2a.

FIG. 3b is a perspective view of the third example water slide in FIG. 3a.

The figures show the same elements and elements having the same function identified with the same reference notation.

DETAILED DESCRIPTION

Figure 1A:
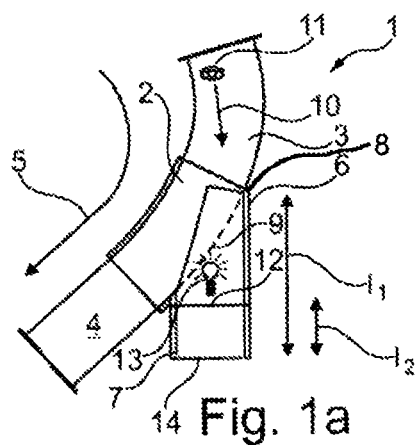
FIG. 1a is a longitudinal view through a first example water slide having a blind tube designed according to an aspect of the disclosure.
Figure 1B:
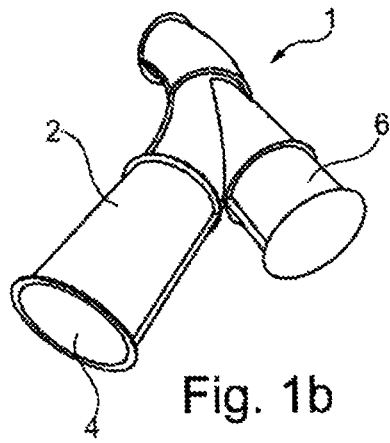

FIGS. 1a and 1b show a first embodiment of a water slide 1 designed according to the disclosure in various views. This shows a tubular slide portion 2 with a peripheral wall 3 enclosed at the periphery and with a slide surface 4 formed by the peripheral wall 3, which is exposed to a water stream during operation. The tubular slide portion 2 defines a sliding direction 5 (slide course) shown to the right of the former for reasons of simplicity.

This also shows that a blind tube portion 6 (through which the user cannot slide) which is adjacent to the tubular slide portion 2 also has a peripheral wall 3, which is closed on the periphery, i.e., a blind tube peripheral wall 7. The blind tube portion 6 has a blind tube opening 8 on the front end facing the tubular slide portion 2, closed on the tubular slide portion end by a transparent peripheral wall segment 9 of the peripheral wall 3 of the tubular slide portion 2 made of acrylic glass, for example, so that a user cannot slide into the blind tube portion 6 but follows the sliding direction 5 predetermined by the tubular slide portion 2. Merely as an example, the cylindrical tubular slide portion 2 and the blind tube portion 6 have a circular inside peripheral contour. Other internal peripheral contours are also feasible, despite the cylindrical design, in particular a shape that is almost approximately oval, optionally with a flattened bottom and/or cover segment.

This shows that the blind tube portion 6 essentially continues a presumed sliding direction, which coincides with the direction of view 10 of a user 11, as indicated in the drawing. In the specific embodiment here, the blind tube portion 6 is therefore adjacent to a right-hand curve segment of the tubular slide portion 2, essentially being tangential to the sliding direction 5.

Effect means 12 are situated in the free cross section of the blind tube portion 6, for example, in the form of a screen or mirror facing in the direction of the user 11 and/or the tubular slide portion 2 and at a distance from the transparent peripheral wall segment 9, which borders an external curve radius and is situated in an outer curve radius.

Furthermore, FIG. 1a shows that the blind tube portion 6 is illuminated more, i.e., is brighter than the tubular slide portion 2 with the help of illumination means 13, shown in a stylized form.

A maximum length $l_1$ of the blind tube portion 6 in this specific embodiment amounts to 3 m, and the effect means 12 are spaced a distance $l_2$ away from the (rear) end 14 of the blind tube portion 6 facing away from the tubular slide portion 2 in the embodiment shown here.

FIG. 1b shows the water slide according to FIG. 1a in a perspective view. This shows in particular the tubular slide portion 2, through which the user can slide completely and which is designed in a blind tube portion 6, which is adjacent to a curve segment and is closed at one end here, for example.

Figure 2A:
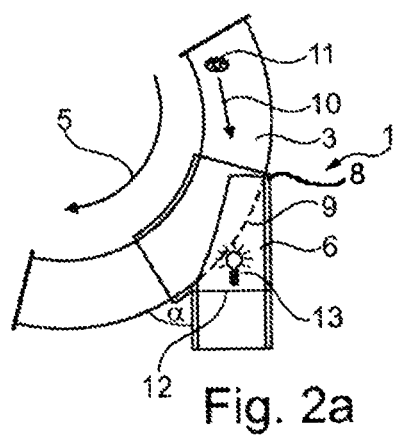
FIG. 2a is a longitudinal view through a second example water slide having a blind tube designed according to an aspect of the disclosure.
Figure 2B:
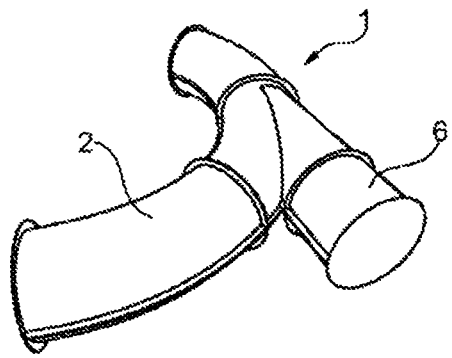

The water slide variant shown in FIGS. 2a and 2b, which conforms to the concept of the disclosure, differs from the variant shown in FIGS. 1a and 1b essentially only in the different geometry. The right-hand curve here and thus the sliding direction (sliding course and/or sliding passage) is designed with a greater curvature, so that the user experiences surprisingly stronger forces, namely centrifugal forces here, when sliding past and/or over the transparent peripheral wall segment 9. This also shows effect means 12, indicated here, for example, only in the form of a screen or a mirror. Additionally or alternatively, a three-dimensional object or just an image of such an object may be placed at this location, for example.

As with the embodiment described above, the sliding direction 5 and the longitudinal extent of the blind tube portion 6 also form an angle here. An angle α is also spanned between the tubular slide portion 2 and the blind tube portion 6.

Figure 3A:
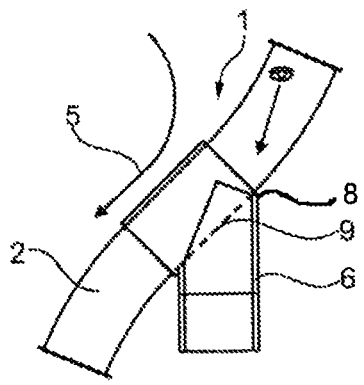
FIG. 3a is a longitudinal view through a third example water slide having a blind tube designed according to an aspect of the disclosure.
Figure 3B:
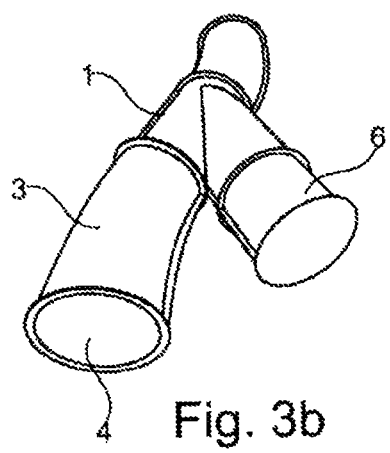

In the embodiment of the water slide according to FIGS. 3a and 3b, the tubular slide portion 2 describes essentially an S-shaped curve, and the blind tube portion 6 is essentially adjacent to a saddle-shaped segment of this S-shaped curve course. Here again, the transparent peripheral wall segment 9 separates the tubular slide portion 2 from the blind tube portion 6.

Figure 4:
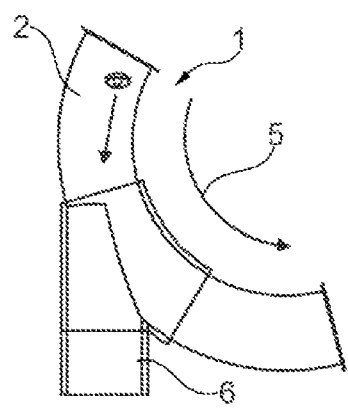
FIG. 4 is a longitudinal view of a water slide curving to the user's left side and having a blind tube extending substantially tangential to the water slide according to an aspect of the disclosure.

FIG. 4 shows a longitudinal section viewed through a tubular slide portion 2 that describes a left-handed curve. This is essentially a mirror symmetrical form of the embodiment according to FIG. 2a, so that reference is made to this respective description of the figures with respect to what they have in common.

Figure 5:
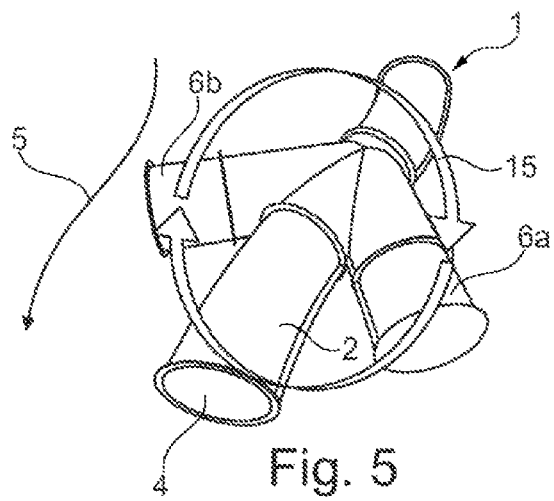
FIG. 5 is a perspective view of a water slide in which two blind tube portions are disposed on the same periphery, spaced a distance apart in the circumferential direction, in accordance with an aspect of the disclosure.

FIG. 5 shows an embodiment of a water slide 1 designed according to the concept of the disclosure in which two blind tube portions 6 are disposed on the same periphery, spaced a distance apart in the circumferential direction, adjacent to a common tubular slide portion 2 and separated from it in the interior by means of a transparent peripheral wall segment (not shown). The arrows 15 indicate that the water slide 1 according to FIG. 5 can be erected in any orientation in space, but the gradient of the tubular slide portion 2 may be sufficient to allow the user to slide through it from the beginning to the end.

Figure 6:
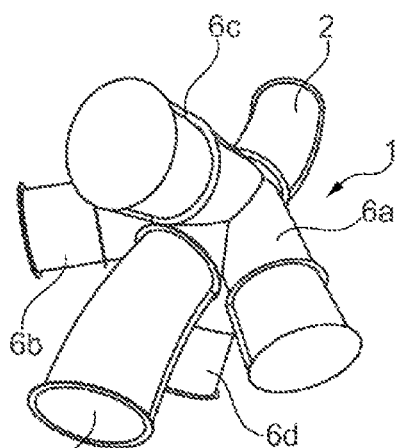
FIG. 6 is a perspective view of a water slide in which several blind tube portions are disposed on the same periphery according to an aspect of the disclosure.

FIG. 6 shows another alternative variant of a water slide—in comparison with the embodiment according to FIG. 5, this also shows two additional blind tube portions 6c and 6d in addition to the two blind tube portions 6a and 6b on the same peripheral wall segment, wherein all the blind tube portions 6a to 6d are separated from the tubular slide portion 2 by one or more transparent peripheral wall segments (not shown).

Figure 7:
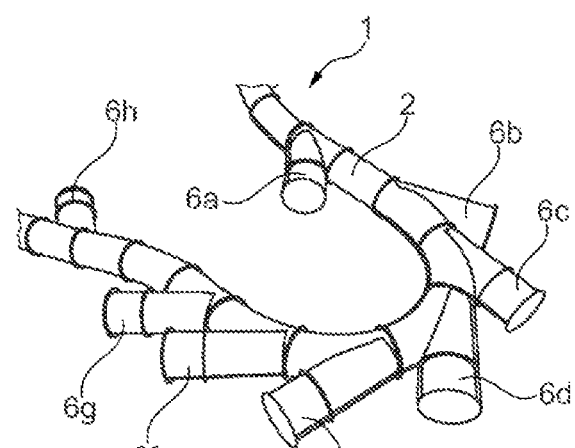
FIG. 7 is a perspective view of a water slide in which several blind tube portions are located along a length of a tubular slide portion, in accordance with an aspect of the disclosure.

FIG. 7 shows another alternative embodiment, in which several blind tube portions 6a to 6h, for example eight of them, are shown here as examples on a tubular slide portion 2 as well, adjacent to the tubular slide portion 2, and each respective blind tube opening is covered and/or concealed by a transparent peripheral wall segment of the tubular slide portion 2.

Figure 8:
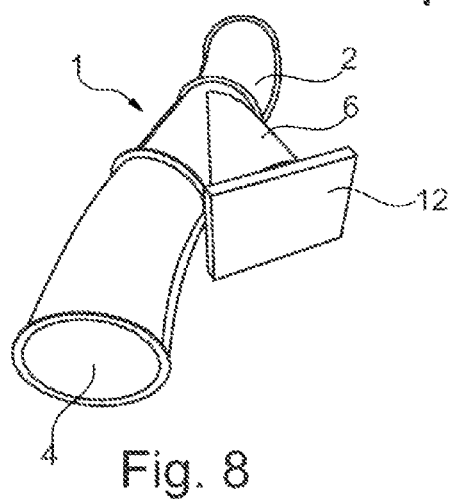
FIG. 8 is a perspective view of a water slide in which a display screen is disposed on the blind tube portion, in accordance with an aspect of the disclosure.

FIG. 8 shows an embodiment in which effect means 12, shown here in the form of a display screen, are disposed on the blind tube portion 6 adjacent to a tubular slide portion 2 having an essentially S-shaped curvature.

LIST OF REFERENCE SYMBOLS

1 Water slide
2 Tubular slide, tubular slide portion
3 Peripheral wall
4 Slide surface
5 Sliding direction/slide course
6 Blind tube portion
6a-6h Blind tube portions
7 Blind tube peripheral wall
8 Blind tube opening
9 Transparent peripheral wall segment
10 Direction of view
11 User
12 Effect means
13 Illuminating means
14 End
15 Arrows
$l_1$ Length of the blind tube portions
$l_2$ Distance between the end of the blind tube portions and the effect means
α Angle between the tubular slide portion and blind tube portion

The invention claimed is:

1. A water slide, comprising:
a tubular slide portion, which has a slide surface and defines a sliding direction and has a first peripheral wall; and
a blind tube portion with a second peripheral wall surrounding a blind tube opening that faces the slide surface of the tubular slide portion, wherein the blind tube opening is closed by a transparent peripheral wall segment of the tubular slide portion and is adjacent to the tubular slide portion.

2. The water slide according to claim 1, wherein the transparent peripheral wall segment includes a plurality of sections and forms, at least in one of the plurality of sections, a segment of the slide surface of the tubular slide portion that is wettable with a water stream.

3. The water slide according to claim 2 wherein the water stream is a water film.

4. The water slide according to claim 1, wherein the first peripheral wall of the tubular slide portion is opaque around the transparent peripheral wall segment or is at least less transparent than the transparent peripheral wall segment covering the blind tube opening.

5. The water slide according to claim 1, wherein the transparent peripheral wall segment is made of clear glass or transparent plastic.

6. The water slide according to claim 5, wherein the transparent peripheral wall segment is made of polymethyl methacrylate.

7. The water slide according to claim 1, wherein the blind tube portion is adjacent to a curve segment of the tubular slide portion on an outer curve radius of the tubular slide portion.

8. The water slide according to claim 7, wherein the second peripheral wall of the blind tube portion extends tangential to the outer curve radius of the tubular slide portion and the transparent peripheral wall segment is curved not only in the peripheral direction but also in a direction of the outer curve radius.

9. The water slide according to claim 1, wherein the blind tube opening is adjacent a bottom segment of the tubular slide portion extending in the sliding direction and a bottom segment of the blind tube portion forms an angle between 1° and 45° with the bottom segment of the tubular slide portion.

10. The water slide according to claim 1, wherein the blind tube portion is inclined downward at an angle to the vertical between 1° and 45°.

11. The water slide according to claim 1, further comprising a blind slide segment formed by a bottom segment of the blind tube portion that continuously lengthens the slide surface of the tubular slide portion in a straight line with a linear slide surface course or with the same radius of curvature with a curved slide surface course of the tubular slide portion.

12. The water slide according to claim 1, wherein a cover segment of the tubular slide portion develops continuously into a cover segment of the blind tube portion.

13. The water slide according to claim 1, wherein a bottom segment of the tubular slide portion develops continuously into a bottom segment of the blind tube portion.

14. The water slide according to claim 1, further comprising several blind tube portions adjacent to the tubular slide portion along the sliding direction, each blind tube portion having a blind tube opening, each being closed by a transparent peripheral wall segment of the tubular slide portion, wherein at least two of the blind tubes extend in different directions directly adjacent to each other.

15. The water slide according to claim 1, further comprising illumination means assigned to the blind tube portion for illuminating the blind tube portion more brightly in an area adjacent to the tubular slide portion and visible from the direction of the tubular slide portion than the tubular slide portion in an area in the sliding direction upstream or downstream from the blind tube opening.

16. The water slide according to claim 1, wherein a three-dimensional object or an image of such an object is disposed in the blind tube portion.

17. The water slide according to claim 1, further comprising a mirror is disposed in the blind tube portion as a closing element on an end of the blind tube portion at a distance from the transparent peripheral wall segment, wherein the mirror is aligned in the direction of the tubular slide portion.

18. The water slide according to claim 1, further comprising a display screen or a projection surface in the blind tube portion aligned in the direction of the tubular slide portion and irradiated with a projector.

19. The water slide of claim 1, wherein a cross-sectional area of the blind tube portion has approximately a same cross-sectional area as the tubular slide portion.

20. The water slide of claim 1, wherein the tubular slide portion and the blind tube portion have approximately a same maximum diameter.

21. A water slide system, comprising:
a tubular slide portion, which has a slide surface and defines a sliding direction and has a first peripheral wall;
a blind tube portion with a second peripheral wall surrounding a blind tube opening that faces the slide surface of the tubular slide portion, wherein the blind tube opening is closed by a transparent peripheral wall segment of the tubular slide portion and is adjacent to the tubular slide portion; and
a water pump for conveying water to form a water stream on the slide surface of the tubular slide portion and on at least some sections of the transparent peripheral wall segment.

* * * * *